(12) United States Patent
Takagi

(10) Patent No.: US 8,863,259 B2
(45) Date of Patent: Oct. 14, 2014

(54) METHOD OF CONTROLLING BIOMETRIC AUTHENTICATION SYSTEM, NON-TRANSITORY, COMPUTER READABLE STORAGE MEDIUM AND BIOMETRIC AUTHENTICATION SYSTEM

(75) Inventor: Junji Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/406,953

(22) Filed: Feb. 28, 2012

(65) Prior Publication Data

US 2012/0159600 A1 Jun. 21, 2012

Related U.S. Application Data

(63) Continuation of application No. PCT/JP2009/004775, filed on Sep. 18, 2009.

(51) Int. Cl.
*H04L 29/00* (2006.01)
*G06F 21/32* (2013.01)

(52) U.S. Cl.
CPC ..................... *G06F 21/32* (2013.01)
USPC .............................. 726/7; 713/186

(58) Field of Classification Search
CPC ............ G06F 21/20; G06F 21/00; H04L 9/00
USPC .............................. 713/186; 726/7
See application file for complete search history.

(56) References Cited

U.S. PATENT DOCUMENTS

| | | | |
|---|---|---|---|
| 6,928,547 B2 * | 8/2005 | Brown et al. ................. | 713/186 |
| 2008/0031496 A1 | 2/2008 | Takagi | |
| 2008/0172725 A1 | 7/2008 | Fujii et al. | |

FOREIGN PATENT DOCUMENTS

| | | |
|---|---|---|
| AU | 2004254771 A1 | 1/2005 |
| EP | 0 935 221 A2 | 8/1999 |
| EP | 1 890 233 A1 | 2/2008 |
| JP | 9-288648 | 11/1997 |
| JP | 11-224236 | 8/1999 |
| JP | 2001-256191 | 9/2001 |
| JP | 2004-318756 | 11/2004 |
| JP | 2005-182641 | 7/2005 |
| JP | 2008-40763 | 2/2008 |
| JP | 2008-65835 | 3/2008 |
| JP | 2008-176407 | 7/2008 |

OTHER PUBLICATIONS

International Search Report for PCT/JP2009/004775 mailed Oct. 20, 2009.
Extended European Search Report issued Aug. 25, 2014 in corresponding European Patent Application No. 09849453.7.

* cited by examiner

*Primary Examiner* — Brandon Hoffman
*Assistant Examiner* — Michael D Anderson
(74) *Attorney, Agent, or Firm* — Staas & Halsey LLP

(57) ABSTRACT

A control method for controlling a biometric authentication system including a server that stores reference biometric data, and a client that acquires biometric authentication data of the user, has saving in the server a table in which identification information identifying the user and a previous authentication result of the user are associated with each other, transmitting the identification information to the server, referring to the identification information and acquiring a previous authentication result of the user corresponding to the identification information from the table, calculating, an authentication success rate of the user from the acquired previous authentication result, transmitting the reference biometric data to the client when the authentication success rate is less than or equal to a certain value, calculating, a degree of matching between the biometric authentication data and the reference biometric data, and determining, whether or not the authentication of the user has succeeded.

13 Claims, 8 Drawing Sheets

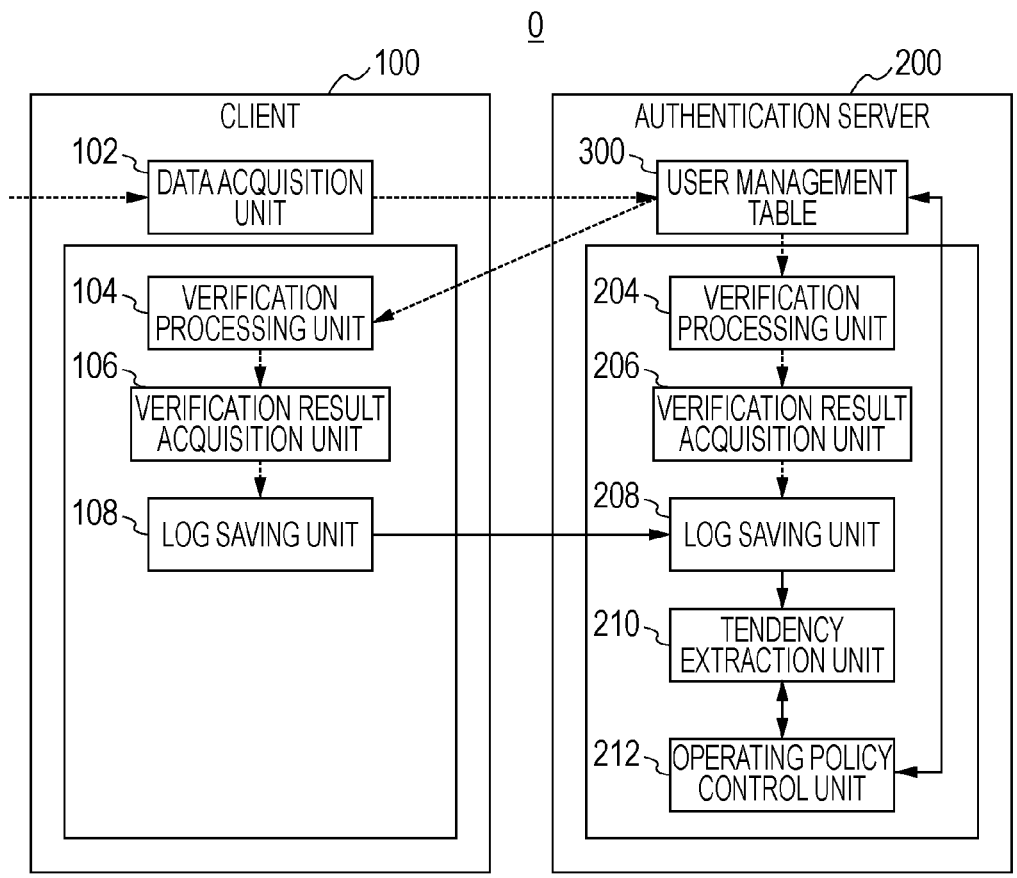

FIG. 3  400

| 402 | 404 | 406 | 408 | 410 | 412 | 414 | 416 | 418 | 420 |
|---|---|---|---|---|---|---|---|---|---|
| DATE AND TIME | USER ID | CLIENT NAME | IP ADDRESS | AUTHENTICATION TYPE | BIOMETRIC DATA TYPE | AUTHENTICATION PROGRAM VERSION LEVEL | VERIFICATION ALGORITHM | VERIFICATION SCORE | AUTHENTICATION RESULT |
| 1/20/2008 13:00 | User0001 | Client0002 | 10.1.1.12 | FINGERPRINT AUTHENTICATION | RIGHT INDEX FINGER | V2L10 | MINUTIAE POINT + PATTERN MATCHING | 70 | SUCCESS |
| 1/20/2008 13:00 | User0002 | Client0002 | 10.1.1.12 | FINGERPRINT AUTHENTICATION | RIGHT INDEX FINGER | V2L10 | MINUTIAE POINT + PATTERN MATCHING | 60 | FAILURE |
| 1/20/2008 13:00 | User0003 | Client0002 | 10.1.1.12 | FINGERPRINT AUTHENTICATION | LEFT INDEX FINGER | V2L10 | MINUTIAE POINT + PATTERN MATCHING | 50 | FAILURE |
| 1/20/2008 8:00 | User0004 | Client0001 | 10.1.1.11 | FINGERPRINT AUTHENTICATION | RIGHT INDEX FINGER | V1L10 | MINUTIAE POINT | 80 | SUCCESS |

FIG. 4  700

| 702 | 704 | 706 |
|---|---|---|
| CLIENT NAME | IP ADDRESS | LOCAL-AUTHENTICATED-USER FLAG |
| Client0001 | 10.1.1.11 | OFF |
| Client0002 | 10.1.1.12 | ON |
| Client0003 | 10.1.1.12 | OFF |

| CLIENT NAME | IP ADDRESS | USER ID | AUTHENTICATION TYPE | AUTHENTICATION PROGRAM VERSION LEVEL |
|---|---|---|---|---|
| Client0002 | 10.1.1.12 | User0001 | FINGERPRINT AUTHENTICATION | V2L10 |
| Client0002 | 10.1.1.12 | User0002 | FINGERPRINT AUTHENTICATION | V2L10 |
| Client0002 | 10.1.1.12 | User0003 | FINGERPRINT AUTHENTICATION | V2L10 |
| Client0001 | 10.1.1.11 | User0004 | FINGERPRINT AUTHENTICATION | V1L10 |

900

| USER ID ~902 | REGISTERED FINGERPRINT TEMPLATE ~904 | AUTHENTICATION DATA TYPE ~906 | REGISTRATION QUALITY ~908 |
|---|---|---|---|
| User0001 | A075D705E37183AE | RIGHT INDEX FINGER | 9 |
| User0002 | 5E166DAC6CA5836B | LEFT INDEX FINGER | 7 |
| User0003 | B4DCEAA380E2F443 | RIGHT INDEX FINGER | 8 |

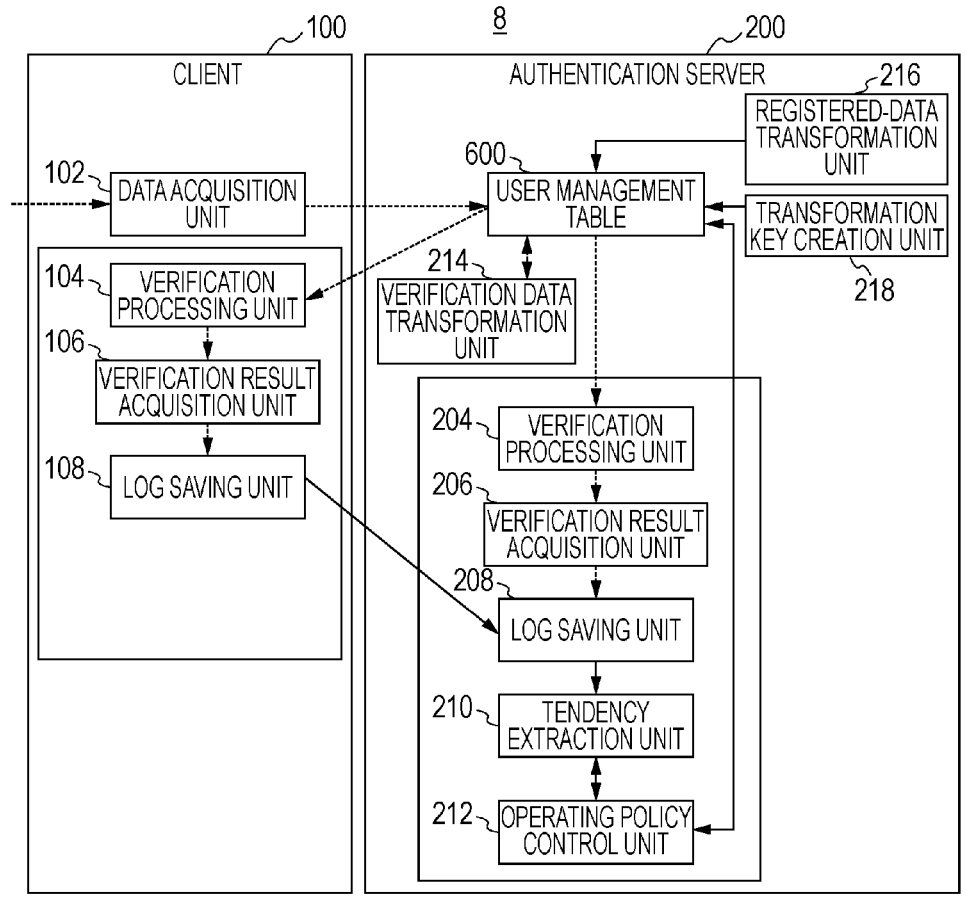

METHOD OF CONTROLLING BIOMETRIC AUTHENTICATION SYSTEM, NON-TRANSITORY, COMPUTER READABLE STORAGE MEDIUM AND BIOMETRIC AUTHENTICATION SYSTEM

CROSS-REFERENCE TO RELATED APPLICATION

This is a continuation of Application PCT/JP2009/004775, filed on Sep. 18, 2009, the entire contents of which are incorporated herein by reference.

FIELD

The present art relates to a biometric authentication system and a control method.

BACKGROUND

There is a client-server biometric authentication system. A client acquires biometric data of a user. A server holds a registered template used as a reference for the authentication of the user. Upon receipt of an authentication request from a client, a server performs a verification process between biometric data for verification, which has been transmitted from the client, and a registered template held in the server. If the degree of matching between the biometric data and the registered template, which has been calculated in the verification process, is greater than or equal to a threshold, the server authorizes the client to access the system. A client-server biometric authentication system can manage access to a server by allowing the server to manage authentication results as a log.

In biometric authentication, a server may use a plurality of algorithms when verifying the identity of an individual. For example, when verifying the identity of an individual, the server firstly performs verification based on minutiae points. If the degree of matching is greater than or equal to a threshold, the identity is verified and access to the system is authorized. If the degree of matching obtained in the verification based on minutiae points is less than or equal to the threshold, the server further performs a pattern matching process. When the degree of matching obtained in the pattern matching process is greater than or equal to a threshold, access to the system is authorized.

For users who are difficult to authenticate, the server needs to perform a pattern matching process in addition to a verification process based on minutiae points. Thus, the amount of computation to be performed by the server increases, and the authentication process time becomes long. In addition, because of the increase in the amount of computation in a fingerprint authentication process to be performed by the server on a user who is difficult to authenticate, a concentration of authentication requests from users who are difficult to authenticate to the server causes an increase in the load on the server (see, for example, Japanese Laid-open Patent Publication No. 09-288648 and Japanese Laid-open Patent Publication No. 2005-182641).

SUMMARY

According to an aspect of an embodiment, a control method for controlling a biometric authentication system including a server that stores reference biometric data used as a reference for authentication of a user, and a client that acquires biometric authentication data from the user, the control method has saving in the server a table in which identification information identifying the user and a previous authentication result of the user are associated with each other, transmitting the identification information identifying the user to the server from the client, referring to, at the server, the identification information transmitted from the client and acquiring a previous authentication result of the user corresponding to the identification information from the table, calculating, at the server, an authentication success rate of the user from the acquired previous authentication result, transmitting the reference biometric data from the server to the client when the authentication success rate is less than or equal to a certain value, calculating, at the client, a degree of matching between the biometric authentication data and the reference biometric data transmitted from the server, and determining, based on the degree of matching, whether or not the authentication of the user has succeeded.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a biometric authentication system (part 1) according to this embodiment.
FIG. 2 is a diagram illustrating a user management table.
FIG. 3 is a diagram illustrating a log of verification results.
FIG. 4 is a diagram illustrating a client management table.
FIG. 9 is a diagram illustrating a biometric authentication system (part 4) according to this embodiment.
FIG. 10 is a diagram illustrating a user management table.

DESCRIPTION OF EMBODIMENT

Figures 5, 6:
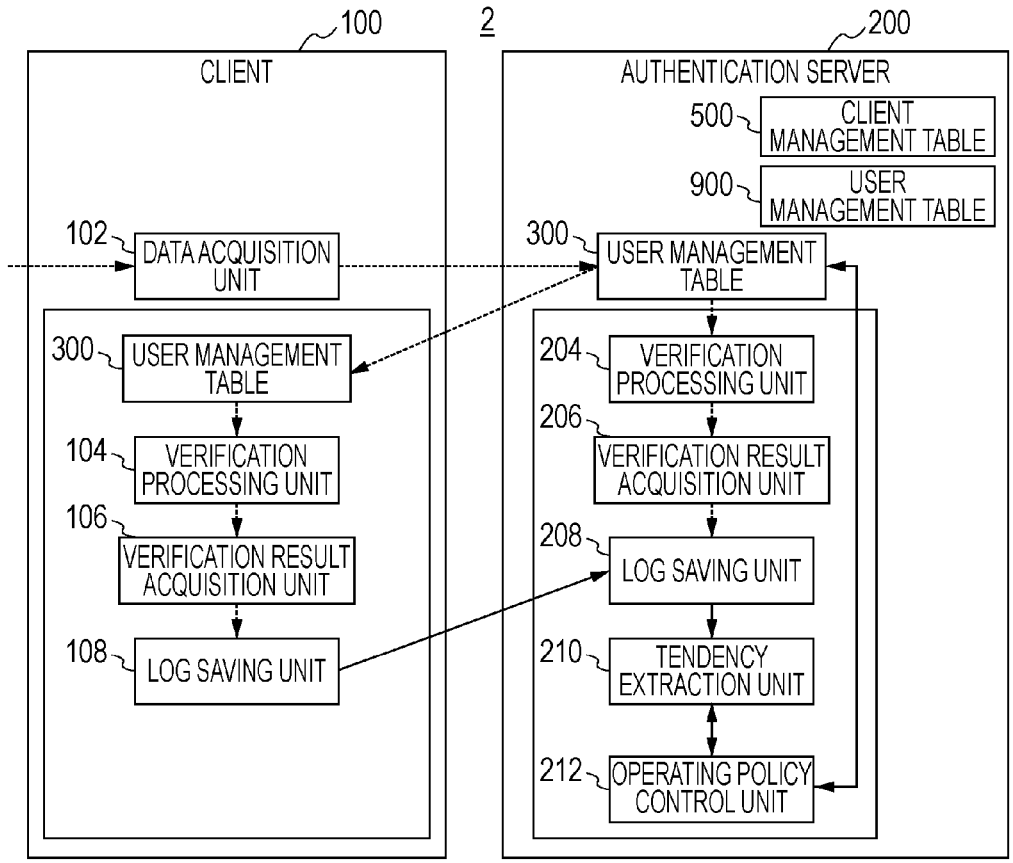
FIG. 5 is a diagram illustrating a biometric authentication system (part 2) according to this embodiment.
FIG. 6 is a diagram illustrating a client management table.

FIG. 1 illustrates a biometric authentication system 0 according to this embodiment. The operation during authentication is represented by broken line arrows in FIG. 1. The biometric authentication system 0 includes a client 100 and an authentication server 200. The client 100 includes a data acquisition unit 102, a verification processing unit 104, a verification result acquisition unit 106, and a log saving unit 108. The authentication server 200 includes a user management table 300, a verification processing unit 204, a verification result acquisition unit 206, a log saving unit 208, a tendency extraction unit 210, and an operating policy control unit 212.

The data acquisition unit 102 acquires a user ID and data for verification, which is used in biometric authentication, and transmits the user ID and the data for verification to the authentication server 200. The verification processing unit 104 calculates the degree of matching between the data for verification and a registered template transmitted from the authentication server 200, and for determining, based on the degree of matching, whether or not the associated user has succeeded in the authentication. The verification result acquisition unit 106 acquires the verification result for the user obtained by the verification processing unit 104, and saves the verification result in the log saving unit 108.

The verification processing unit 204 calculates the degree of matching between the data for verification, which is transmitted from the client 100, and a registered template, and for determining, based on the degree of matching, whether or not the user has succeeded in the authentication. The verification result acquisition unit 206 acquires the verification result for the user obtained by the verification processing unit 204, and saves the verification result in the log saving unit 208. The tendency extraction unit 210 calculates the authentication success rate of each user for a certain period from log information saved in the log saving unit 208 in order to determine a user who is difficult to authenticate. The operating policy control unit 212 instructs the tendency extraction unit 210 to periodically extract the tendency of authentication results for each user from the log information saved in the log saving unit 208 in order to identify a user who is difficult to authenticate.

FIG. 2 illustrates an example of the user management table 300. The user management table 300 has a user ID 302, a registered fingerprint template 304, a fingerprint data type 306, a registration quality 308, and a local-authenticated-user flag 310.

The user ID 302 is an ID of a user who performs biometric authentication. The registered fingerprint template 304 is data that is registered in advance by a user and that is used as a reference for biometric authentication. The fingerprint data type 306 is a type of data to be used in biometric authentication. The registration quality 308 is the quality of the registered fingerprint template 304. In this embodiment, when the registered fingerprint template 304 is registered, biometric data of the user is acquired in a plurality of number of times and the registered fingerprint template 304 is generated from the acquired data. For example, if the fingerprint of the user is in good condition, every acquired piece of biometric data has a high degree of matching. Accordingly, the quality is defined to be high when the degree of matching between the acquired pieces of biometric data is high. The local-authenticated-user flag 310 is a flag indicating which of server authentication and local authentication to apply for each user.

The authentication server 200 is capable of determining which of server authentication and local authentication to apply for each user by referring to the local-authenticated-user flag 310.

The data acquisition unit 102 of the client 100 acquires a user ID and data for verification, which is used in biometric authentication, and transmits the user ID and the data for verification to the authentication server 200. The authentication server 200 refers to the local-authenticated-user flag 310 included in the user management table 300 illustrated in FIG. 2, based on the user ID transmitted from the client 100. The authentication server 200 determines whether to perform server authentication or local authentication on the corresponding user. If server authentication is to be performed on the corresponding user, the verification processing unit 204 performs a verification process between a registered template and the data for verification. The verification result acquisition unit 206 acquires a verification result, and saves a log of the verification result in the log saving unit 208. On the other hand, if local authentication is to be performed on the corresponding user, the authentication server 200 transmits the user ID, the data for verification, and the registered template to the client 100. The verification processing unit 104 of the client 100 performs a verification process between the registered template and the data for verification. The verification result acquisition unit 106 acquires a verification result, and saves a log of the verification result in the log saving unit 108. When local authentication is performed, the client 100 transmits an authentication result to the log saving unit 208 of the authentication server 200 in a way synchronous or asynchronous to the authentication time.

Here, FIG. 3 illustrates an example of a log 400 of verification results. The log 400 of verification results is a table having a date and time 402, a user ID 404, a client name 406, an IP address 408, an authentication type 410, a biometric data type 412, an authentication program version level 414, a verification algorithm 416, a verification score 418, and an authentication result 420.

The date and time 402 indicates the date and time when biometric authentication was performed. The user ID 404 indicates the ID of a user who performed biometric authentication. The client name 406 indicates the name of a client that performed biometric authentication. The IP address 408 indicates the IP address of a client that performed biometric authentication. The authentication type 410 indicates a method of biometric authentication. The biometric data type 412 indicates a type of biometric information used in biometric authentication. The authentication program version level 414 indicates the version of a program under which authentication is performed. The verification algorithm 416 indicates a verification algorithm used in biometric authentication. In this embodiment, first, verification is performed using minutiae points of biometric data. Then, for a user whose identity has not been successfully verified only with the minutiae points, verification is performed using pattern matching of biometric data. The verification score 418 is a value indicating the score to be referred to for determining whether to perform automatic switching to local authentication, and is a value indicating the degree to which the registered template and the data for verification match. The authentication result 420 indicates authentication success or failure.

An exemplary implementation of operation when dynamically controlling an operating policy as to which of local authentication and server authentication to apply is indicated by solid line arrows in FIG. 1. The operating policy control unit 212 instructs the tendency extraction unit 210 to periodically extract the tendency of authentication results for each user from the log 400 of verification results in order to identify a user who is difficult to authenticate. In this embodiment, the operating policy control unit 212 instructs the tendency extraction unit 210 to calculate an authentication success rate of each user for a certain period from the log information in order to identify a user who is difficult to authenticate. The operating policy control unit 212 may identify a user who is difficult to authenticate by using the average value of verification scores obtained for a certain period or using information on an algorithm used for verification.

The tendency extraction unit 210 calculates an authentication success rate of each user for a certain period from previous authentication results of the user by referring to the log 400 of verification results. If the authentication success rate is greater than or equal to a threshold, the operating policy control unit 212 changes the local-authenticated-user flag 310 in the user management table 300 in order to perform server authentication. If the authentication success rate is less than or equal to the threshold, the operating policy control unit 212 changes the local-authenticated-user flag 310 in the user management table 300 in order to perform local authentication.

In the example illustrated in FIG. 2, furthermore, the operating policy control unit 212 can specify local authentication on a user-by-user basis. However, the operating policy control unit 212 may specify local authentication on a client-by-client basis. In order to specify local authentication on a client-by-client basis, the authentication server 200 may have a client management table 700 illustrated in FIG. 5. The client management table 700 has a client name 702, an IP address 704, and a local-authenticated-user flag 706.

In this embodiment, an example in which an authentication success rate is calculated for each user ID and the local-authenticated-user flag 310 included in the user management table 300 is updated has been illustrated. Additionally, the tendency extraction unit 210 may calculate an authentication success rate for each client, and the operating policy control unit 212 may set the local-authenticated-user flag 310 for each client. The operating policy control unit 212 periodically performs the above processes in batch processing, and dynamically controls an operating method by switching from server authentication to local authentication when the authentication success rate decreases and by switching from local authentication to server authentication when the authentication success rate increases.

In the biometric authentication system 0 illustrated in FIG. 1, the authentication server 200 has the user management table 300, and determines whether to switch to local authentication by referring to the local-authenticated-user flag 310 in the user management table 300. FIG. 5 illustrates a biometric authentication system 2 for speeding up this process. In the biometric authentication system 2 illustrated in FIG. 5, the client 100 also has the user management table 300. Elements corresponding to those described with reference to FIG. 1 are assigned the same numerals, and a description thereof is omitted.

At the time of authentication, the data acquisition unit 102 of the client 100 acquires a user ID and data for verification, which is used in biometric authentication. Then, the client 100 refers to the user management table 300 by using the user ID acquired by the data acquisition unit 102. The client 100 performs a verification process between the registered template owned by the client and the verification data if the corresponding user is to be authenticated using local authentication. The client 100 transmits the user ID and the data for verification to the authentication server 200 if the corresponding user is to be authenticated using server authentication. The process performed in the authentication server 200 is similar to the process of the biometric authentication system 0 illustrated in FIG. 1.

If the corresponding user ID is not found in the user management table 300 owned by the client 100, server authentication is performed. In the biometric authentication system 2 illustrated in FIG. 5, the client 100 is capable of determining which of server authentication and local authentication to perform. Therefore, quick switching to local authentication can be made at the time of authentication without using communication between the authentication server 200 and the client 100.

An exemplary implementation of operation when dynamically controlling the operating policy in a case where the client 100 has the user management table 300 is indicated by solid line arrows in FIG. 5. The operating policy control unit 212 instructs the tendency extraction unit 210 to periodically extract the tendency of authentication results for each user from the log information in order to identify a user who is difficult to authenticate. Subsequently, similarly to the biometric authentication system 0 illustrated in FIG. 1, the tendency extraction unit 210 calculates an authentication success rate of each user for a certain period, determines whether to perform local authentication or server authentication, and updates the user management table 300 owned by the authentication server 200.

The user management table 300 owned by the client 100 and the user management table 300 owned by the authentication server 200 need to be synchronized with each other. For this purpose, the authentication server 200 periodically transmits the user management table 300 to the client 100. However, it is not acceptable for security reasons that all the pieces of user data held in the authentication server 200 are transmitted to the data registered in the client 100. For this reason, there is a need to limit user information to be periodically transmitted to the client 100 from the authentication server 200. Consequently, the authentication server 200 has a client management table 500 illustrated in FIG. 6, and limits the user information to be transmitted to the client 100.

The client management table 500 has a client name 502, an IP address 504, a user ID 506, an authentication type 508, and an authentication program version level 510. The authentication server 200 refers to the IP address 504 corresponding to the client identified by the client name 502. Then, the authentication server 200 transmits user information to the client 100. The client management table 500 can be created manually by a system administrator or may be periodically created from the log 400 of verification results. In addition, in order to achieve synchronization between the data owned by the client 100 and the data owned by the authentication server 200, the client 100 periodically refers to the user management table 300 owned by the client 100, and periodically downloads a registered template for only a user for local authentication from the authentication server 200 to make an update.

In the biometric authentication system 0 illustrated in FIG. 1 and the biometric authentication system 2 illustrated in FIG. 5, first, the authentication server 200 calculates an authentication success rate of each user for a certain period in order to speed up the authentication process and reduce load. Then, a user who is difficult to authenticate, which will require a large amount of computation to authenticate, is identified, and a user to be authenticated with local authentication is set.

Further, an embodiment in which a user who is difficult to authenticate in biometric authentication is identified using the quality of a registered template and quality information about data for verification will be described. In a case where the quality of a registered template is used, in FIG. 1 and FIG. 5, the tendency extraction unit 210 extracts a user for which the registration quality is less than or equal to a threshold from the user management table 300 when dynamically changing the operating policy. If the registration quality is less than or equal to the threshold, the operating policy control unit 212 changes the local-authenticated-user flag 310 in the user management table 300 to local authentication. If the registration quality is greater than or equal to the threshold, the operating policy control unit 212 changes the local-authenticated-user flag 310 in the user management table 300 to server authentication.

The local-authenticated-user flag 310 in the user management table 300 can also be changed when a user registers a registered template. In the user management table 300, if one user ID has a plurality of registered templates, the average value of the registration qualities of the plurality of registered templates and the quality of registered data to be frequently used for verification from the log 400 of verification results may be calculated to determine whether to perform local authentication or server authentication. It is assumed that the threshold for the quality of registered data for determining whether to perform local authentication or server authentication is defined in the system.

Figures 7, 8:
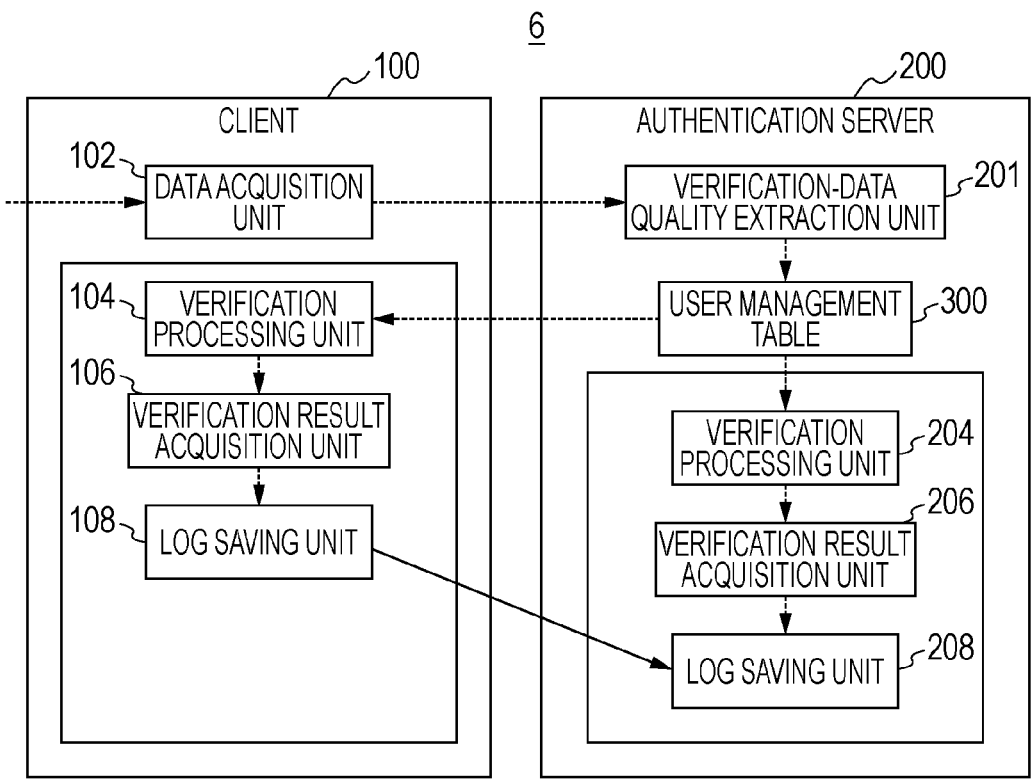
FIG. 7 is a diagram illustrating a client management table.
FIG. 8 is a diagram illustrating a biometric authentication system (part 3) according to this embodiment.

Next, FIG. 8 illustrates a biometric authentication system 6 for determining whether to perform local authentication or server authentication by using quality information about data for verification. Elements corresponding to those described with reference to FIG. 1 and FIG. 5 are assigned the same numerals, and a description thereof is omitted. The verification-data quality extraction unit 201 extracts the quality of data for verification, which has been transmitted from the client 100.

At the time of authentication, the data acquisition unit 102 of the client 100 acquires a user ID and data for verification, which is used in biometric authentication, and transmits the user ID and the data for verification to the authentication server 200. The verification-data quality extraction unit 201 of the authentication server 200 extracts the quality of the data for verification, which has been transmitted from the client 100. If the quality of the data for verification is greater than or equal to a threshold, the verification processing unit 204 of the authentication server 200 performs a verification process between a registered template and the data for verification. The verification result acquisition unit 206 acquires a verification result, and saves a log of the verification result in the log saving unit 208. On the other hand, if the quality of the data for verification is less than or equal to the threshold, a registered template is acquired from a user management table 900 illustrated in FIG. 7, and the authentication server 200 transmits the data for verification, the user ID, and the registered template to the client 100.

Here, the quality of the data for verification will be described. For example, if a fingerprint of a user is in good condition, the ridge portions and the valley portions clearly appear in obtained data for verification. A binarization process is performed on the data for verification in which the ridge portions and the valley portions clearly appear to generate a density histogram representing the image density distribution, where peak values about the ridge portions and the valley portions also clearly appear. In this embodiment, data for verification in which peak values about the ridge portions and the valley portions clearly appear is defined as high-quality data.

If the local-authenticated-user flag 310 of the corresponding user represents local authentication, the authentication server 200 transmits the user ID, the data for verification, and the registered template to the client 100. The verification processing unit 104 of the client 100 performs a verification process between the registered template and the data for verification. The verification result acquisition unit 106 acquires a verification result, and saves a log of the verification result in the log saving unit 108. When local authentication is performed, the client 100 transmits the authentication result to the log saving unit 208 of the authentication server 200 in a way synchronous or asynchronous to the authentication time.

It is assumed that the threshold for determining whether to perform local authentication or server authentication is defined in the system. In addition, the client 100 may extract data for verification at the time of authentication and may transmit the quality of the data for verification together with the user ID and the data for verification to the authentication server 200.

In the biometric authentication system 6 described above, a registered template is downloaded into the client 100 from the authentication server 200 and the client 100 performs a verification process. Thus, the registered template for a user may leak from a communication path, and the leakage of the registered template would introduce a risk of a spoofing attack. Since biometric information is basically invariable during the lifetime of the user although it may change over time, there is a risk of unauthorized access during the lifetime of the user by someone spoofing the user once the registered data leaks.

Now, a description will be given of cancelable biometric authentication in which in order to realize local authentication with high security maintained even if a registered template leaks, the registered template is transformed using a transformation key during automatic switching to local authentication and data for verification is also transformed using the transformation key to allow verification between the transformed pieces of data.

In this embodiment, if a registered template leaks, the transformation key is changed and a registered template is re-registered. Therefore, unauthorized access can be prevented.

The operation of a biometric authentication system 8 based on cancelable biometric authentication during authentication is represented by broken line arrows in FIG. 9. Elements corresponding to those described with reference to FIG. 1, FIG. 5, and FIG. 8 are assigned the same numerals, and a description thereof is omitted. A transformation key creation unit 218 creates key information for transforming data. A verification data transformation unit 214 transforms data for verification using the key information created by the transformation key creation unit 218. A registered-data transformation unit 216 transforms a registered fingerprint template using the key information created by the transformation key creation unit 218.

The data acquisition unit 102 of the client 100 acquires a user ID and data for verification, which is used in biometric authentication, and transmits the user ID and the data for verification to the authentication server 200. The authentication server 200 refers to a local-authenticated-user flag included in a user management table 600 from the user ID transmitted from the client 100. If the corresponding user is to be authenticated using server authentication, the verification processing unit 204 performs a verification process between the registered template and the data for verification. The verification result acquisition unit 206 acquires a verification result, and saves a log of the verification result in the log saving unit 208.

On the other hand, if the local-authenticated-user flag of the corresponding user represents local authentication, the verification data transformation unit 214 transforms the data for verification using the transformation key included in the user management table 600. The authentication server 200 transmits the user ID, the transformed data for verification, and the transformed registered template to the client 100. The verification processing unit 104 of the client 100 performs a verification process between the transformed registered template and the transformed data for verification. The verification result acquisition unit 106 acquires a verification result, and saves a log of the verification result in the log saving unit 108. When local authentication is performed, the authentication result is transmitted to the log saving unit 208 of the authentication server 200 in a way synchronous or asynchronous to the authentication time.

FIG. 10 illustrates an example of the user management table 600. The user management table 600 has a user ID 602, a registered fingerprint template 604, a transformed registered fingerprint template 606, a transformation key 608, a fingerprint data type 610, a registration quality 612, and a local-authenticated-user flag 614. The transformation key 608 is key information for transforming the registered fingerprint template 604. The transformed registered fingerprint template 606 is a template produced by the registered-data transformation unit 216 transforming the registered fingerprint template by using the key information created by the transformation key creation unit 218. The user management table 600 has a transformed registered template that has been created by the registered-data transformation unit 216 by using the transformation key produced in advance by the transformation key creation unit, thereby quickly realizing cancelable authentication at the time of authentication. It is assumed that cancelable biometric authentication can also be applied in the biometric authentication system 2, the biometric authentication system 4, and the biometric authentication system 6 described above.

An exemplary implementation of operation when dynamically controlling an operating policy as to which of local authentication and server authentication to perform in case of applying cancelable biometric authentication is indicated by solid line arrows in FIG. 10. The operating policy control unit 212 instructs the tendency extraction unit 210 to periodically extract the tendency of authentication results for each user from the log information in order to identify a user who is difficult to authenticate.

Subsequently, similarly to the biometric authentication system 0 illustrated in FIG. 1, the tendency extraction unit 210 calculates an authentication success rate of each user for a certain period, and determines whether to perform local authentication or server authentication. Then, the tendency extraction unit 210 updates the user management table 600 owned by the authentication server 200.

In this embodiment, the transformation key creation unit 218 creates a transformation key only for a user to be authenticated with local authentication, and transforms the associated registered template. Then, the operating policy control unit 212 stores the transformed registered template and the transformation key in the user management table 600. If it is determined that server authentication is to be performed, the operating policy control unit 212 deletes the transformed registered template and the transformation key from the user management table 600. The operating policy control unit 212 periodically performs the above processes in batch processing, and dynamically controls an operating method.

This embodiment can also be applied to the biometric authentication system 2 in which the client 100 has the user management table 300 illustrated in FIG. 2.

Figure 11:
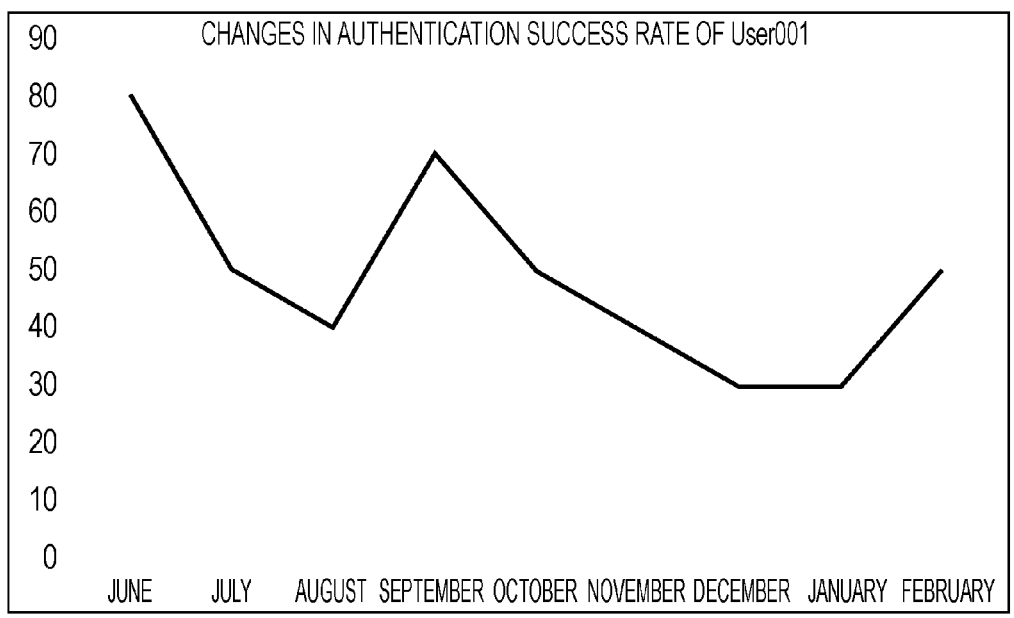
FIG. 11 is a diagram illustrating changes in authentication success rate.

Subsequently, the foregoing embodiment will be described specifically with reference to a diagram illustrated in FIG. 11 which illustrates changes in the authentication success rate of a user. FIG. 11 illustrates changes in the authentication success rate when User0001 performed fingerprint authentication. The horizontal axis represents the time when the User0001 performed fingerprint authentication. The vertical axis represents the authentication success rate of the User0001.

An embodiment will be described in which changing between local authentication and server authentication is based on the authentication success rate of each user. FIG. 11 illustrates changes in the authentication success rate when the User0001 performs fingerprint authentication. If it is assumed that the current month is January, the finger of the User0001 is dry and thus the authentication success rate in December is reduced to 30%. Upon receipt of an authentication request from the User0001, the authentication server 200 performs a pattern matching process in addition to verification based on only minutiae points to verify the identity of the User0001. Accordingly, if an authentication request is issued from the User0001, the amount of computation increases, leading to an increased load on the authentication server 200.

In this embodiment, the authentication server 200 periodically acquires an authentication success rate of the User0001 for the previous one month (December) from the authentication log, and finds that the authentication success rate is 30%. Since the authentication success rate is lower than an authentication success rate of 40%, which is a system defined threshold, the authentication server 200 changes the local-authenticated-user flag of the User0001 in the user management table to local authentication.

At the time of authentication, the User0001 inputs a user ID and fingerprint data from the client 100. The client 100 transmits the user ID and fingerprint data for verification to the authentication server 200. The authentication server 200 determines, based on the user ID transmitted from the client 100, whether to perform local authentication or server authentication on the User0001. The authentication server 200 refers to the local-authenticated-user flag 310 of the User0001 in the user management table 300, and determines that local authentication is to be performed. The authentication server 200 transmits the user ID, the biometric data for verification, and a registered template to the client 100. The client 100 performs a verification process.

In March, when the state of the finger of the User0001 returns to a normal state from a dry state and when the authentication success rate becomes high, the authentication server 200 acquires an authentication success rate for the previous one month (February) from the authentication log, and finds that the authentication success rate is 50%. Since the authentication success rate is over a system defined authentication success rate of 40%, the authentication server 200 changes the local-authenticated-user flag 310 of the User0001 in the user management table 300 to server authentication.

At the time of authentication, the User0001 inputs a user ID and fingerprint data from the client 100. The client 100 transmits the user ID and fingerprint data for verification to the authentication server 200. The authentication server 200 determines, based on the user ID transmitted from the client 100, whether to perform local authentication or server authentication on the User0001. The authentication server 200 refers to the local-authenticated-user flag 310 of the User0001 in the user management table 300, and determines that server authentication is to be performed. The authentication server 200 refers to the registered fingerprint template 304 in the user management table 300 held in the authentication server 200, and performs a verification process with the biometric data for verification, which has been transmitted from the client 100. The authentication server 200 transmits an authentication result to the client 100.

An embodiment in which the client 100 determines whether to perform local authentication or server authentication will be described. If it is assumed that the current month is January, the finger of the User0001 is dry, and the authentication success rate in December is reduced to 30%. Upon receipt of an authentication request from the User0001, the authentication server 200 performs a pattern matching process in addition to verification based on only minutiae points to verify the identity of the User0001. Accordingly, if an authentication request is issued from the User0001, the length of the authentication process time increases, leading to an increased load on the authentication server 200.

In this embodiment, the authentication server 200 periodically acquires the authentication success rate of the User0001 for the previous one month (December), i.e., "30%", from the authentication log. Since the authentication success rate is lower than an authentication success rate of 40%, which is a system defined threshold, the authentication server 200 changes the local-authenticated-user flag of the User0001 in the user management table 300 to local authentication.

The authentication server 200 periodically refers to the client management table 500, and finds that the client 100 (Client0002) is used by the User0001, User0002, and User0003. The authentication server 200 extracts user information about the User0001, the User0002, and the User0003 from the client management table 500, and transmits the user information to the Client0002, thereby allowing the client 100 (Client0002) to update the user management table 300 and hold the updated user management table 300.

At the time of authentication, the User0001 inputs a user ID and fingerprint data from the client 100 (Client0002). The client 100 determines, based on the user ID input from the client 100, whether to perform local authentication or server authentication on the User0001. The client 100 (Client0002) refers to the local-authenticated-user flag 310 of the User0001 in the user management table 300 owned by the client 100 (Client0002), and determines that local authentication is to be performed. The client 100 (Client0002) extracts a registered template for the User0001 from the user management table 300, and performs a verification process with the biometric data for verification.

In March, when the state of the finger of the User0001 returns to a normal state from a dry state and when the authentication success rate becomes high, the authentication server 200 acquires the authentication success rate for the previous one month (February), i.e., "50%", from the authentication log. Since the authentication success rate is over a system defined authentication success rate of 40%, the authentication server 200 changes the local-authenticated-user flag of the User0001 in the user management table 300 to server authentication. The authentication server 200 periodically refers to the client management table 500, and finds that the client 100 (Client0002) is used by the User0001, the User0002, and the User0003. The authentication server 200 extracts user information about the User0001, the User0002, and the User0003 from the client management table 500, and transmits the user information to the Client0002. This allows the client 100 (Client0002) to update the user management table 300 and hold the updated user management table 300. Here, the local-authenticated-user flag of the User0001, which is held in the client 100 (Client0002), is changed from local authentication to server authentication.

At the time of authentication, the User0001 inputs a user ID and fingerprint data from the client 100 (Client0002). The client 100 determines, based on the user ID input from the client 100, whether to perform local authentication or server authentication on the User0001. The client 100 (Client0002) refers to the local-authenticated-user flag of the User0001 in the user management table 300 held therein, and determines that server authentication is to be performed. The client 100 (Client0002) transmits the user ID and the biometric data for verification to the authentication server 200. The authentication server 200 refers to the registered template for the User0001 from the user management table, and performs a verification process with the data for verification. The authentication server 200 transmits an authentication result to the client 100 (Client0002), and also saves the authentication result in the authentication server 200 as a log.

An embodiment in which it is determined whether to perform local authentication or server authentication in accordance with the quality of the registered template will be described. It is assumed that the User0001 registers a registered fingerprint template in the authentication server 200 in December, when the finger is dry and is not suitable for fingerprint authentication, and that the registration quality is "4". The authentication server 200 periodically refers to the user management table 300, and changes the setting of a user for which the registration quality is less than or equal to a system defined threshold of "5" for registration quality to local authentication. The registered template for the User0001 as of January was registered in December, and the registration quality is "4". Thus, the authentication server 200 changes the local-authenticated-user flag of the User0001 in the user management table 300 to local authentication. It is assumed that the check of the registration quality and the changing of the local-authenticated-user flag can also be performed when a user registers fingerprint data. Subsequently, the process for local authentication is performed in a way similar to that of the process described above.

An embodiment for providing dynamic changing between server authentication and local authentication on a client-by-client basis will be described. The authentication server 200 periodically calculates the authentication success rate of each client from the log 400 of verification results, and determines that local authentication is to be performed if the authentication success rate is less than or equal to a system defined threshold, and that server authentication is to be performed if the authentication success rate is greater than or equal to the threshold. The client management table 700 manages local authentication flags on a client-by-client basis. The Client0002 is assigned local authentication.

At the time of authentication, a user inputs a user ID and fingerprint data from the client 100. The client 100 transmits the user ID, fingerprint data for verification, and the client name (Client0002) to the authentication server 200. The authentication server 200 determines, based on the client name (Client0002) transmitted from the client 100, whether to perform local authentication or server authentication on the User0001. The authentication server 200 refers to the local-authenticated-user flag of the Client0002 in the client management table 700, and determines that local authentication is to be performed. Subsequently, local authentication is performed using a method similar to the method described above.

Additionally, for example, the IP address of the client 100 may also be used if it is information capable of uniquely identifying the client. In addition, the authentication server 200 may transmit information about the client management table 700 to the client 100 in advance, and, at the time of authentication, the client 100 may determine whether to perform local authentication or server authentication by using the client 100 information.

An embodiment in which it is determined whether to perform local authentication or server authentication in accordance with the quality of data for verification will be described. The User0001 inputs a user ID and fingerprint data from the client 100. The client 100 creates data for verification, and transmits the data for verification together with the user ID to the authentication server 200. It is assumed that, as a result of the authentication server 200 having acquired the quality value of the data for verification from the data for verification of the User0001 transmitted from the client 100, the quality value is "4". If the system defines that the quality value is less than or equal to a threshold of "5" for data for verification as a condition where the setting is changed to local authentication, the authentication server 200 determines that local authentication is to be performed, and transmits the user ID, the biometric data for verification, and the registered template to the client 100. The client 100 performs a fingerprint verification process.

An embodiment in which the client 100 performs user data management will be described. It is assumed that the client 100 periodically receives the user management table 300 from the authentication server 200 and holds the user management table 300. After that, the client 100 periodically refers to the local-authenticated-user flag in the user management table 300 owned by the client 100. Since the User0001 is a user to be authenticated with local authentication, the registered fingerprint template, fingerprint data type, and registration quality about the User0001 are downloaded from the authentication server 200. Then, the client 100 updates the user management table 300 held in the client 100.

An embodiment in which local authentication is performed using transformed registered data will be described. At the time of authentication, the User0001 inputs a user ID and fingerprint data from the client 100. The client 100 transmits the user ID and fingerprint data for verification to the authentication server 200. The authentication server 200 determines, based on the user ID transmitted from the client 100, whether to perform local authentication or server authentication on the User0001. The authentication server 200 refers to the local-authenticated-user flag 614 of the User0001 in the user management table 600, and determines that local authentication is to be performed. The authentication server 200 transforms the data for verification using a transformation key (AhAoAfA14) for the User0001 in the user management table 600.

Then, the authentication server 200 transmits the user ID, the transformed biometric data for verification, and the transformed registered template to the client 100. The client 100 performs a verification process between the transformed biometric data for verification and the transformed registered template. Meanwhile, at the time of authentication, the User0002 inputs a user ID and fingerprint data from the client 100, and transmits the user ID and fingerprint data for verification from the client 100 to the authentication server 200.

The authentication server 200 determines, based on the user ID transmitted from the client 100, whether to perform local authentication or server authentication on the User0002. Thus, the authentication server 200 refers to the local-authenticated-user flag of the User0002 in the user management table 600, and determines that server authentication is to be performed. After that, the authentication server 200 performs a verification process between the data for verification, which has been transmitted from the client, and the registered template for the User0002 in the user management table 600.

An embodiment in which user data is managed when local authentication is performed using transformed registered data will be described. The authentication server 200 calculates an authentication success rate of the User0001 for the previous one month (December), that is, "30%". Since the authentication success rate is lower than an authentication success rate of "40%", which is a system defined threshold, the authentication server 200 changes the local-authenticated-user flag of the User0001 in the user management table 600 to local authentication. In this case, the transformation key creation unit creates a transformation key for the User0001, transforms the registered template in the user management table 600, and stores the resulting registered template in the user management table 600.

In March, when the state of the finger of the User0001 returns to a normal state from a dry state and when the authentication success rate becomes high, the authentication server 200 acquires the authentication success rate of the User0001 for the previous one month (February), i.e., "50%", from the authentication log. Since the authentication success rate is over an authentication success rate of "40%", which is a system defined threshold, the authentication server 200 changes the local-authenticated-user flag of the User0001 in the user management table 600 to server authentication. In this case, the authentication server 200 deletes the transformation key for the User0001 and the transformed registered template from the user management table 600.

An embodiment in which the client 100 manages user data when performing local authentication using transformed registered data will be described. It is assumed that the client 100 periodically receives the user management table 600 from the authentication server 200 and owns the user management table 600. Then, the client 100 periodically refers to the user management table 600 owned by the client 100, and refers to the local-authenticated-user flag. Since the User0001 is a user to be authenticated with local authentication, the client 100 downloads the transformed registered fingerprint template, fingerprint data type, registration quality, and transformation key about the User0001 from the authentication server 200. The client 100 updates the user management table 600 owned by the client 100.

In March, when the state of the finger of the User0001 returns to a normal state from a dry state and when the authentication success rate becomes high, the authentication server 200 acquires the authentication success rate of the User0001 for the previous one month (February), i.e., "50%", from the authentication log. Since the authentication success rate is over a system defined authentication success rate of 40%, the authentication server 200 changes the local-authenticated-user flag of the User0001 in the user management table 600 to server authentication. Then, the client 100 periodically refers to the user management table 600 held therein, refers to the local-authenticated-user flag, and detects that the User0001 has been changed from a user to be authenticated with local authentication to that with server authentication. The client 100 deletes the transformation key and the transformed registered template from the user management table 600 owned by the client 100.

Figure 12:
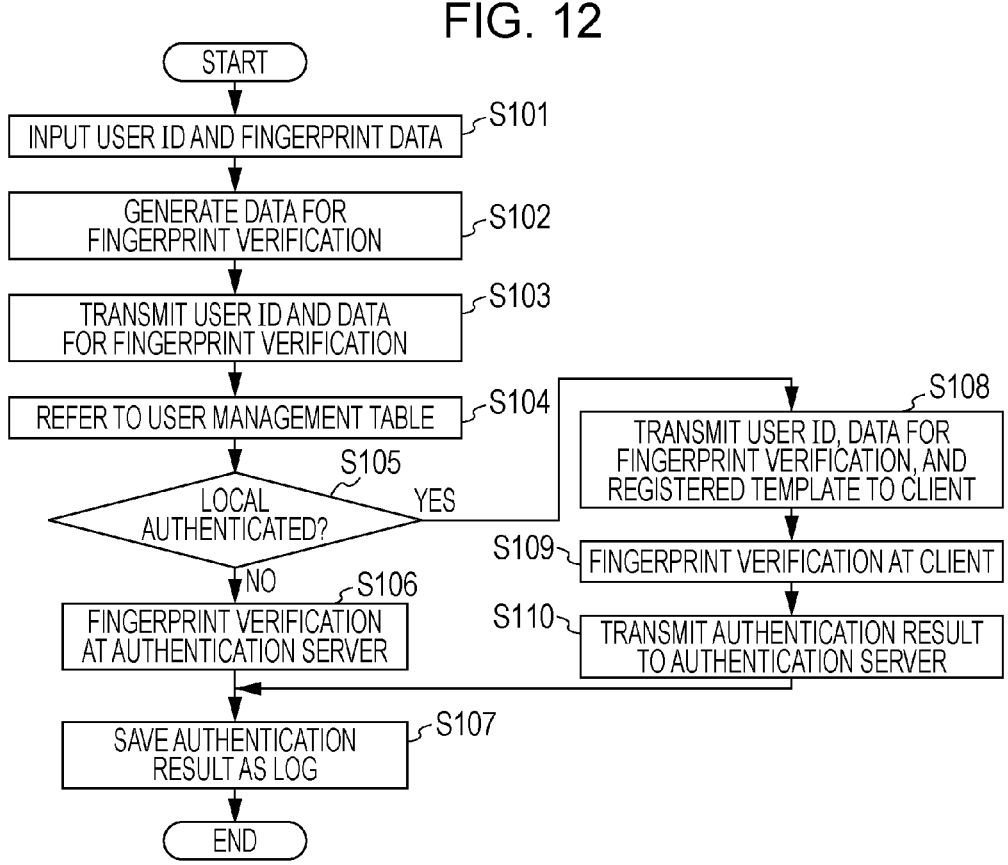
FIG. 12 is a flowchart (part 1) depicting an authentication process according to this embodiment.

FIG. 12 illustrates a flowchart of an authentication process according to this embodiment. In S101, at the time of authentication, a user inputs a user ID and biometric data from the client 100. It is assumed that the biometric data is input from a biometric sensor connected to the client 100. The process proceeds to S102.

In S102, the client 100 generates biometric data for verification from the input biometric data. The process proceeds to S103.

In S103, the client 100 transmits the user ID and the generated biometric data for verification to the authentication server 200. The process proceeds to S104.

In S104, the authentication server 200 refers to the user management table 300 on the basis of the user ID transmitted from the client 100. The process proceeds to S105.

In S105, the authentication server 200 determines whether to perform local authentication or server authentication. If it is determined that local authentication is to be performed, the process proceeds to S106. On the other hand, if it is determined that server authentication is to be performed, the process proceeds to S108.

In S106, the authentication server 200 performs a verification process between the biometric data for verification and a registered template. Then, the authentication server 200 determines whether or not the degree of matching between the biometric data for verification and the registered template, which has been calculated in the verification process, is greater than or equal to a predetermined value. If the degree of matching is greater than or equal to the predetermined value, the authentication server 200 determines that authentication has succeeded. On the other hand, if the degree of matching is not greater than or equal to the predetermined value, the authentication server 200 determines that authentication has failed. The authentication server 200 transmits an authentication result to the client 100. The process proceeds to S107.

In S107, the authentication server 200 saves the authentication result as a log. The process ends.

In S108, the authentication server 200 transmits the user ID, the biometric data for verification, and the registered template to the client 100. The process proceeds to S109.

In S109, the client 100 performs a verification process between the biometric data for verification and the registered template. Then, the client 100 determines whether or not the degree of matching between the biometric data for verification and the registered template, which has been calculated in the verification process, is greater than or equal to a predetermined value. If the degree of matching is greater than or equal to the predetermined value, the client 100 determines that authentication has succeeded. On the other hand, if the degree of matching is not greater than or equal to the predetermined value, the client 100 determines that authentication has failed. The process proceeds to S110.

In S110, the client 100 transmits an authentication result to the authentication server 200 in a way synchronous or asynchronous to the authentication time. The process proceeds to S107, in which the authentication server 200 saves the authentication result obtained when local authentication is performed as a log. The process ends.

Figure 13:
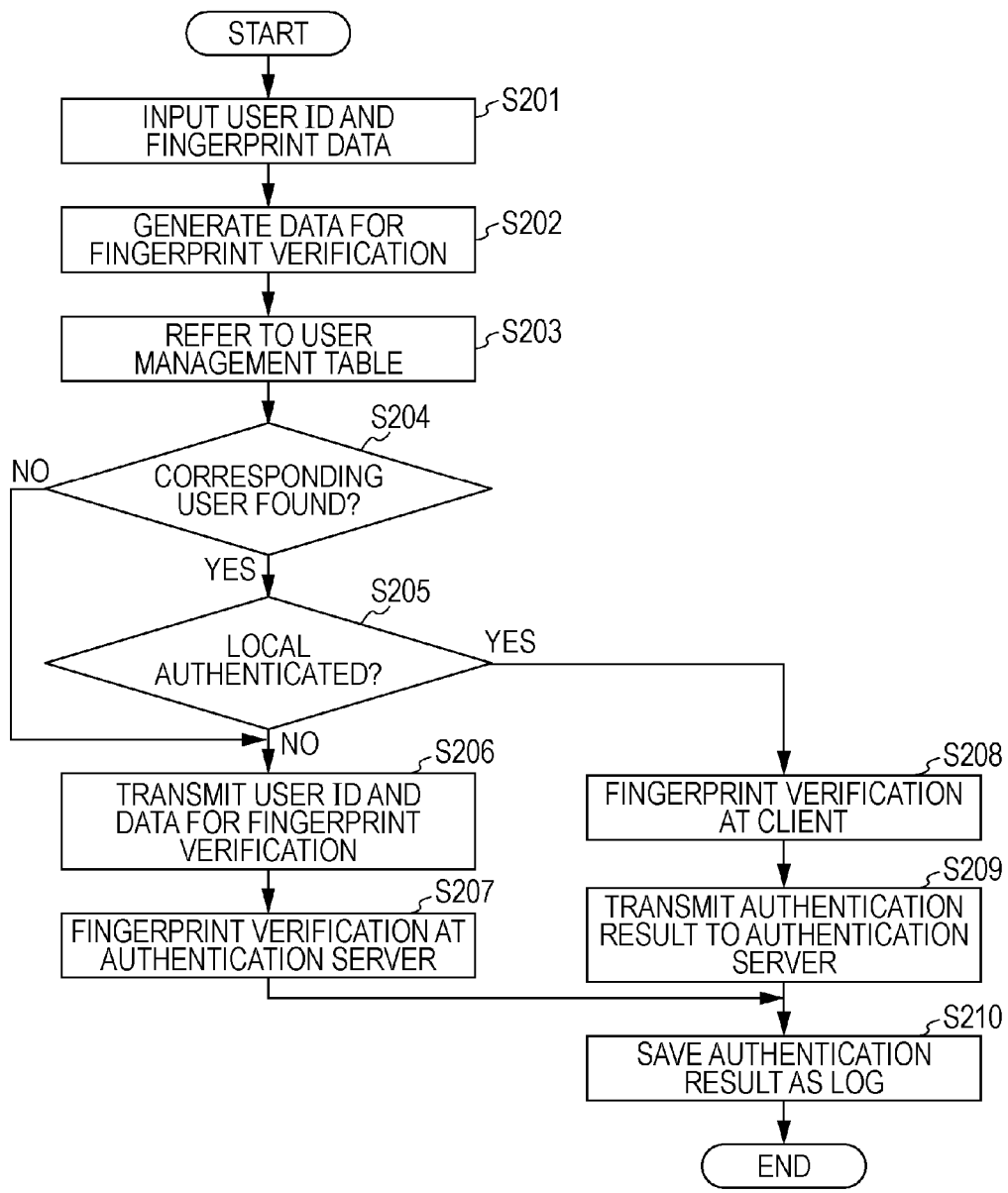
FIG. 13 is a flowchart (part 2) depicting an authentication process according to this embodiment.

FIG. 13 illustrates a flowchart of an authentication process according to this embodiment. In S201, at the time of authentication, a user inputs a user ID and biometric data from the client 100. It is assumed that the biometric data is input from a biometric sensor connected to the client 100. The process proceeds to S202.

In S202, the client 100 generates biometric data for verification from the input biometric data. The process proceeds to S203.

In S203, the client 100 refers to the user management table 300 held in the client 100 on the basis of the input user ID. The process proceeds to S204.

In S204, as a result of the reference to the user management table 300, the client 100 determines whether or not the corresponding user is found. If the corresponding user is found, the process proceeds to S205. On the other hand, if the corresponding user is not found, the process proceeds to S206.

In S205, if the corresponding user information is in the client 100, the client 100 refers to the local-authenticated-user flag 310 the user management table 300, and determines whether to perform local authentication or server authentication. If local authentication is to be performed, the process proceeds to S208. On the other hand, if server authentication is to be performed, the process proceeds to S206.

In S208, the client 100 performs a verification process. The verification process of the client 100 is similar to the process described above, and a description thereof is thus omitted. The process proceeds to S209.

In S209, the client 100 transmits an authentication result to the authentication server 200. The process proceeds to S210.

In S210, the authentication server 200 saves the authentication result transmitted from the client 100. The process ends.

In S206, the client 100 transmits the user ID and the data for verification to the authentication server 200. The process proceeds to S207.

In S207, the authentication server 200 performs a verification process. The verification process of the authentication server 200 is similar to the process described above, and a description thereof is thus omitted. The process proceeds to S210.

Figure 14:
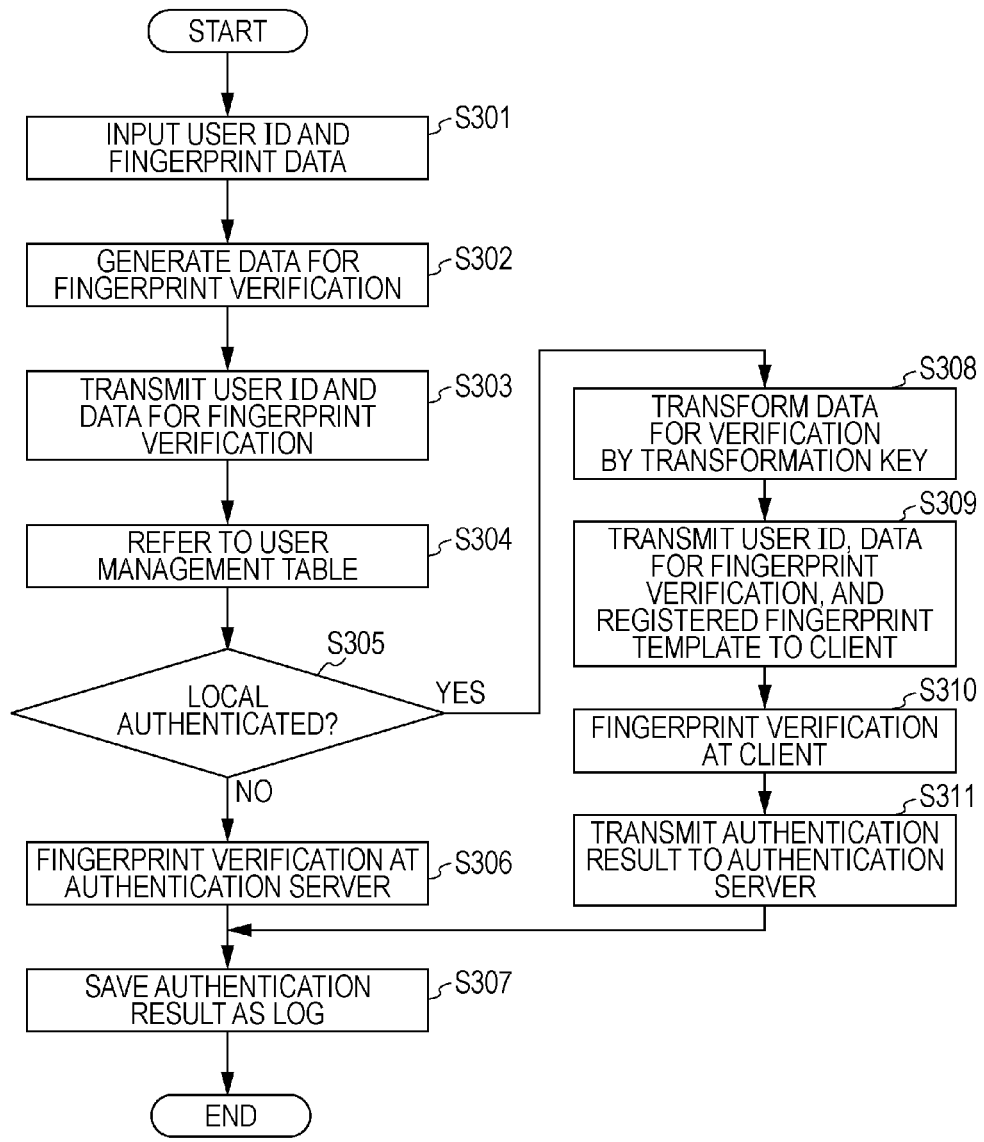
FIG. 14 is a flowchart (part 3) depicting an authentication process according to this embodiment.

FIG. 14 illustrates a flowchart of an authentication process when cancelable biometric authentication is applied during local authentication. In S301, at the time of authentication, a user inputs a user ID and biometric data from the client 100. The process proceeds to S302.

In S302, the client 100 generates biometric data for verification from the input biometric data. The process proceeds to S303.

In S303, the client 100 transmits the user ID and the biometric data for verification to the authentication server 200. The process proceeds to S304.

In S304, the authentication server 200 refers to the user management table 600 on the basis of the user ID transmitted from the client 100. The process proceeds to S305.

In S305, the authentication server 200 determines whether to perform local authentication or server authentication. If it is determined that local authentication is to be performed, the process proceeds to S308. On the other hand, if it is determined that server authentication is to be performed, the process proceeds to S308.

In S306, the authentication server 200 performs a verification process. The verification process of the authentication server 200 is similar to the process described above, and a description thereof is thus omitted. The process proceeds to S307.

In S307, the authentication server 200 saves an authentication result. The process ends.

In S308, the authentication server 200 transforms the data for verification using the transformation key 608 in the user management table 600. The process proceeds to S309.

In S309, the authentication server 200 transmits the user ID, the transformed biometric data for verification, and the transformed registered template to the client 100. The process proceeds to S310.

In S310, the client 100 performs a verification process. The verification process of the client 100 is similar to the process described above, and a description thereof is thus omitted. The process proceeds to S311.

In S311, the client 100 transmits an authentication result to the authentication server 200 in a way synchronous or asynchronous to the authentication time. The process proceeds to S307.

Cancelable biometric authentication can also be applied to an authentication process in which the client 100 holds the user management data 600.

According to this embodiment, the following advantageous effects are achievable. A user for which a long verification process time is required because of the difficulty to verify their fingerprint is authenticated using local authentication, thereby speeding up the authentication process time. A user for which a large amount of computation is required for a fingerprint verification process is authenticated using local authentication, thereby enabling a reduction of the load on the authentication server. The switching between local authentication and server authentication is automatic, thus reducing time and effort required for the system administrator to perform operation management activities. Since authentication is performed using transformed fingerprint template data when switching to local authentication is made, the transformation key is altered and the fingerprint template data is re-registered when the fingerprint data leaks, and unauthorized access can be prevented.

In addition, a plurality of distributed servers connected to an authentication server may perform a verification process on a user for which the authentication success rate is less than or equal to a certain value.

According to an aspect of this embodiment, in a client-server biometric authentication system, the load on a server can be reduced when user processing with a low authentication success rate is performed.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A control method of controlling a biometric authentication system including a server that stores reference biometric data used as a reference for authentication of a user, and a client that acquires biometric authentication data from the user, the control method comprising:
    saving, in the server, associated information in which identification information identifying the user and a previous authentication result of the user are associated with each other;
    transmitting the identification information identifying the user to the server from the client;
    referring to, at the server, the identification information transmitted from the client and acquiring a previous authentication result of the user corresponding to the identification information from the saved associated information;
    calculating, at the server, an authentication success rate of the user from the acquired previous authentication result;
    determining, at the server, to calculate a degree of matching at the client when the calculated authentication success rate does not satisfy a threshold, and to calculate the degree of matching at the server when the calculated authentication success rate satisfies the threshold;
    transmitting, when said determining determines to calculate the degree of matching at the client, the reference biometric data from the server to the client and then calculating, at the client, the degree of matching between the biometric authentication data and the reference biometric data transmitted from the server, so that the degree of matching is thereby calculated at the client when the authentication success rate does not satisfy the threshold; and
    determining, based on the degree of matching calculated at the client, whether or not the authentication of the user has succeeded.

2. The control method according to claim 1, further comprising, when said determining determines to calculate the degree of matching at the server,
    calculating, at the server, the degree of matching between the biometric authentication data, which is transmitted from the client to the server, and the reference biometric data, so that the degree of matching is thereby calculated at the server when the authentication success rate satisfies the threshold, and
    determining whether or not the authentication of the user has succeeded based on the degree of matching calculated at the server.

3. The control method according to claim 1, further comprising storing, in the client, reference biometric data corresponding to a user for which the authentication success rate does not satisfy the threshold, and, when an authentication process is performed on the user, verifying, at the client, biometric authentication data of the user against the stored reference biometric data.

4. The control method according to claim 1, further comprising recording, at the server, a history of authentication results corresponding to the client, and referring to, at the server, the history of authentication results to perform said determining.

5. The control method according to claim 1, further comprising, when said determining determines to calculate the degree of matching at the client, transforming, at the server, the reference biometric data using specific information, transmitting the transformed reference biometric data from the server to the client, transforming, at the client, the biometric authentication data using the specific information, and performing, at the client, a verification process between the transformed reference biometric data and the transformed biometric authentication data.

6. A non-transitory, computer readable storage medium storing a program to control a biometric authentication system including a server that stores reference biometric data used as a reference for authentication of a user, and a client that acquires biometric authentication data from the user, the program, when executed, causes the biometric authentication system to perform a process comprising:
    saving, in the server, associated information in which identification information identifying the user and a previous authentication result of the user are associated with each other;
    transmitting the identification information identifying the user to the server from the client;
    referring to, at the server, the identification information transmitted from the client and acquiring a previous authentication result of the user corresponding to the identification information from the stored associated information;
    calculating, at the server, an authentication success rate of the user from the acquired previous authentication result;
    determining to calculate a degree of matching at the client when the calculated authentication success rate does not satisfy a threshold, and to calculate the degree of matching at the server when the calculated authentication success rate satisfies the threshold;
    when said determining determines to calculate the degree of matching at the client,
        transmitting the reference biometric data from the server to the client, and
        calculating, at the client, the degree of matching between the biometric authentication data and the reference biometric data transmitted from the server, so that the degree of matching is thereby calculated at the client when the authentication success rate does not satisfy the threshold; and determining, based on the degree of matching calculated at the client, whether or not the authentication of the user has succeeded.

7. A biometric authentication system comprising:
a server that stores reference biometric data used as a reference for authentication of a user; and
a client that acquires biometric authentication data from the user,
the server including a storage unit to store associated information in which identification information identifying user and a previous authentication result of the user are associated with each other, a calculating unit to refer to the identification information and the stored associated information, to calculate an authentication success rate of the user from a previous authentication result of the user corresponding to the identification information, and to determine to calculate a degree of matching at the client when the calculated authentication success rate does not satisfy a threshold and to calculate the degree of matching at the server when the calculated authentication success rate satisfies the threshold, and a transmitting unit to transmit the reference biometric data to the client when the calculating unit determines to calculate the degree of matching at the client,
the client including a determining unit to, when the calculating unit of the server determines to calculate the degree of matching at the client, calculate the degree of matching between the biometric authentication data and the reference biometric data, which is transmitted from the server to the client, and to determine, based on the degree of matching, whether or not the authentication of the user has succeeded,
so that the degree of matching is thereby calculated at the client when the authentication success rate does not satisfy the threshold.

8. The biometric authentication system according to claim 7, wherein the server further includes a determining unit to, when the calculating unit of the server determines to calculate the degree of matching at the server, calculate the degree of matching between the biometric authentication data, which is transmitted from the client to the server, and the reference biometric data, and to determine, based on the degree of matching, whether or not the authentication of the user has succeeded, so that the degree of matching is thereby calculated at the server when the authentication success rate satisfies the threshold.

9. The biometric authentication system according to claim 7, wherein the client further includes a storage unit to store reference biometric data corresponding to a user for which the authentication success rate does not satisfy the threshold, and the determining unit of the client calculates a degree of matching between the reference biometric data stored in the storage unit of the client and biometric authentication data of the user, and determines, based on the degree of matching, whether or not the authentication of the user has succeeded.

10. The biometric authentication system according to claim 7, wherein the server further includes a transforming unit to, when the calculating unit of the server determines to calculate the degree of matching at the client, transform, at the server, the reference biometric data using specific information, the client further includes a transforming unit to transform the biometric authentication data using the specific information, and the determining unit of the client calculates a degree of matching between the transformed reference biometric data and the transformed biometric authentication data, and determines, based on the degree of matching, whether or not the authentication of the user has succeeded.

11. The control method according to claim 1, wherein the authentication success rate calculated at the server is a success rate over a prior period of time in which the user has successfully been authenticated by the biometric authentication system.

12. The non-transitory, computer readable storage medium according to claim 6, wherein the authentication success rate calculated at the server is a success rate over a prior period of time in which the user has successfully been authenticated by the biometric authentication system.

13. The biometric authentication system according to claim 7, wherein the authentication success rate calculated at the server is a success rate over a prior period of time in which the user has successfully been authenticated by the biometric authentication system.

* * * * *